United States Patent [19]

Moll

[11] Patent Number: 5,088,573

[45] Date of Patent: Feb. 18, 1992

[54] FOUR-WHEEL STEERING ARRANGEMENT FOR MOTOR VEHICLES

[75] Inventor: Patrick Moll, Leonberg, Fed. Rep. of Germany

[73] Assignee: Dr. Ing. h.c.F. Porsche AG, Fed. Rep. of Germany

[21] Appl. No.: 697,626

[22] Filed: May 9, 1991

Related U.S. Application Data

[63] Continuation of Ser. No. 317,911, Mar. 1, 1989, abandoned.

[30] Foreign Application Priority Data

Mar. 5, 1988 [DE] Fed. Rep. of Germany ....... 3807274

[51] Int. Cl.$^5$ .............................................. B62D 6/00
[52] U.S. Cl. ..................................... 180/140; 280/91; 280/661; 280/696; 280/701
[58] Field of Search .................. 180/140; 280/91, 661, 280/673, 675, 95.1, 696, 701

[56] References Cited

FOREIGN PATENT DOCUMENTS

| | | |
|---|---|---|
| 0096345 | 12/1983 | European Pat. Off. . |
| 0178118 | 10/1985 | European Pat. Off. . |
| 0225773 | 6/1987 | European Pat. Off. . |
| 0263414 | 4/1988 | European Pat. Off. . |
| 0289039 | 11/1988 | European Pat. Off. . |
| 3124821 | 3/1982 | Fed. Rep. of Germany . |
| 3525255 | 1/1986 | Fed. Rep. of Germany . |
| 3630984 | 3/1987 | Fed. Rep. of Germany . |
| 1096872 | 6/1955 | France . |
| 60-154958 | 8/1985 | Japan . |
| 62-23873 | 1/1987 | Japan . |

*Primary Examiner*—Mitchell J. Hill
*Attorney, Agent, or Firm*—Evenson, Wands, Edwards, Lenahan and McKeown

[57] ABSTRACT

A four-wheel steering arrangement for motor vehicles is provided with a first steering device for the front wheels operated by a steering wheel and a second steering device for the rear wheels, which are held by wheel suspension links. The rear wheels are controlled by a hydraulic adjusting device and are adjusted at a variable wheel steering angle ratio with respect to the front wheels, as a function of determined driving condition quantities which are fed to an electronic control unit, particularly a vehicle computer. The steering device comprises a hydraulic control cylinder having a restoring device. This restoring device is connected by adjusting elements providing for the adjustment of the rear wheel steering angles so that they can be swivelled around an axis of rotation formed by support joints between the wheel carrier and the wheel suspension link for steering and are slowly returned to a non-steering position upon system failure.

6 Claims, 6 Drawing Sheets

FOUR-WHEEL STEERING ARRANGEMENT FOR MOTOR VEHICLES

This is a continuation of application Ser. No. 07/317,911, filed Mar. 1, 1989, now abandoned.

BACKGROUND AND SUMMARY OF THE INVENTION

The invention relates to a four-wheel steering arrangement for motor vehicles having a first steering device for the front wheels operated by a steering wheel and having a second steering device for the rear wheels controlled by a hydraulic adjusting device as a function of determined driving condition quantities, fed to an electronic control computer unit to create a variable rear wheel steering angle ratio with respect to the front wheels.

On the basis of European Patent EP-A 0 096 345, a steering arrangement for the rear wheels of a motor vehicle in a four-wheel steering system is known and which comprises a hydraulic adjusting cylinder connected with a wheel suspension element and used for adjusting rear-wheel steering angles. These wheel adjustments, according to DE-OS 31 24 821, take place as a function of operating Parameters of the vehicle, which are processed in an electronic control unit and are fed as output control signals to a control device or multipath valve for controlling the adjusting cylinder.

The invention is based on the object of providing a steering arrangement for a four-wheel steering system for motor vehicles having a first steering device for the front wheels operated by a steering wheel and having a second steering device for the rear wheels controlled by a hydraulic adjusting device as a function of determined driving condition quantities, fed to an electronic control computer unit to create a variable rear wheel steering angle ratio with respect to the front wheels, which ensures an exact steering angle adjustment during the driving operation and an automatic restoring of the rear wheels into a straight-ahead position in the case of a failure of or a defect in the electronic and/or hydraulic control. The steering angles of the rear wheels must also remain unaffected by movements of the wheel suspension link, particularly springing movements. In addition, it should be possible, with very few changes, to retrofit a vehicle, particularly a vehicle having semi-trailing arms, with this steering device.

According to the invention, this object is achieved by having the steering device comprise a hydraulic control cylinder having a restoring device and both of which are connected by adjusting elements to the rear wheels for adjusting the rear wheel steering angles so that the wheels can be swivelled around an axis of rotation, which is formed by support joints between the wheel carrier and the wheel suspension link.

It is also advantageous if the adjusting elements consist of tie rods which are connected with the restoring device and the control cylinder, arranged transversely in the vehicle, and which are connected with longitudinally extending stationary steering levers of a wheel carrier by deflecting joints. Each deflecting joint is arranged between the tie rod and the steering lever along a swivel axis which extends through the bearing of the wheel suspension link at the vehicle body side. The deflecting joint is located adjacent to the swivel axis in such a manner that no change of toe-in occurs during springing movements of the vehicle.

It is also advantageous if the wheel suspension link consists of a semi-trailing arm device which comprises bearing arms which accommodate the wheel carrier between each arm by joints, one joint being arranged above a wheel axis and the other joint being arranged below the wheel axis and wherein these joints form the wheel rotating axis.

The spring restoring device comprises an adjusting rod which is connected with a piston rod of the control cylinder and with the tie rod and which has pressure springs provided to achieve forced restoring movements of the rear wheels into a straight-ahead position with a steering angle $\beta=0$. The adjusting rod is guided in a cylinder tube. A stop disk is fixed to the rod and the pressure springs are arranged against movable pressure disks which can be shifted with respect to the stop disk, and are supported at a stationary sectional ring of the cylinder tube at opposite bearing bushes at the ends of the cylinder to hold the adjusting rod in a center position (M) by the stop disk.

According to an alternative embodiment, the adjusting rod is guided axially slidably between slidable pressure disks, in between which disks is a pressure spring. The Pressure disk support themselves at end stops of the tube to hold the adjusting rod in its position by exterior stop disks fixed at the rod.

For controlling, the control cylinder is coupled with a throttle valve and shutoff valves which are arranged in a hydraulic pressure circuit between a pressure supply unit and the adjusting cylinder. The throttle valve is connected in front of the control cylinder and is located in series with two shutoff valves. One shutoff valve is arranged in the feeding pipe of the cylinder while another shutoff valve is arranged in the return pipe. The throttle and shutoff valves provided for an automatic and relatively slow wheel restoring to a center position (M) when the power supply is interrupted. The throttle valve is spring biased to automatically take up a throttling position and the shutoff valves are spring biased into a shutoff position.

The main advantages achieved by the invention are that a steering device for the rear wheels of a motor vehicle is provided which consists of few components and can be installed in an uncomplicated manner in a vehicle, particularly a vehicle having a semi-trailing arm rear axle. It must be possible to convert in a simple manner a motor vehicle with the known semi-trailing arm axle to a vehicle with all-wheel steering, while its kinematic and elastokinematic characteristics are maintained.

By the special position of the site of the swivel connection between a steering tie rod and a steering lever, an unintentional influencing of the toe-in of the rear wheels is avoided during springing movements of the semi-trailing arm device. If a targeted change of the toe-in of the rear wheel is to be achieved by a wheel lift, this may be influenced in a simple manner by a changed position of the deflecting joint, for example, next to the swivelling axis between the tie rod and the steering lever, as well as by an inclining of the tie rod.

The control cylinder is coupled with a restoring device which affects the cylinder mechanically so that when the electric and/or hydraulic control system fails, the control cylinder is affected such that the rear wheels, which are subjected to a steering angle, are slowly, against the disturbing forces in the wheel tread point, restored to a straight-ahead position. In this position, they are held fast without play while the steered rear axle, in the unpressurized state, has the characteristics of an unsteered rear axle. For this purpose, a throttle valve is provided in the hydraulic control circuit of the steering system by which the pressure medium can flow from one chamber of the control cylinder into the other chamber. In the throttled position, the shutoff valves of the hydraulic steering circuit for the control cylinder are simultaneously also shut. In these positions of the valves, the control cylinder is fixed in its center position by the force of the restoring springs.

Other objects, advantages and novel features of the present invention will become apparent from the following detailed description of the invention when considered in conjunction with the accompanying drawings.

BRIEF DESCRIPTION OF THE DRAWINGS

FIG. 2 is a top view of a constructive representation of a wheel suspension link which, relative to the driving direction, is on the right and has an adjusting device.

FIG. 5 is a partial sectional view of a restoring device having two springs and a control cylinder;

DETAILED DESCRIPTION OF THE DRAWINGS

Figure 1:
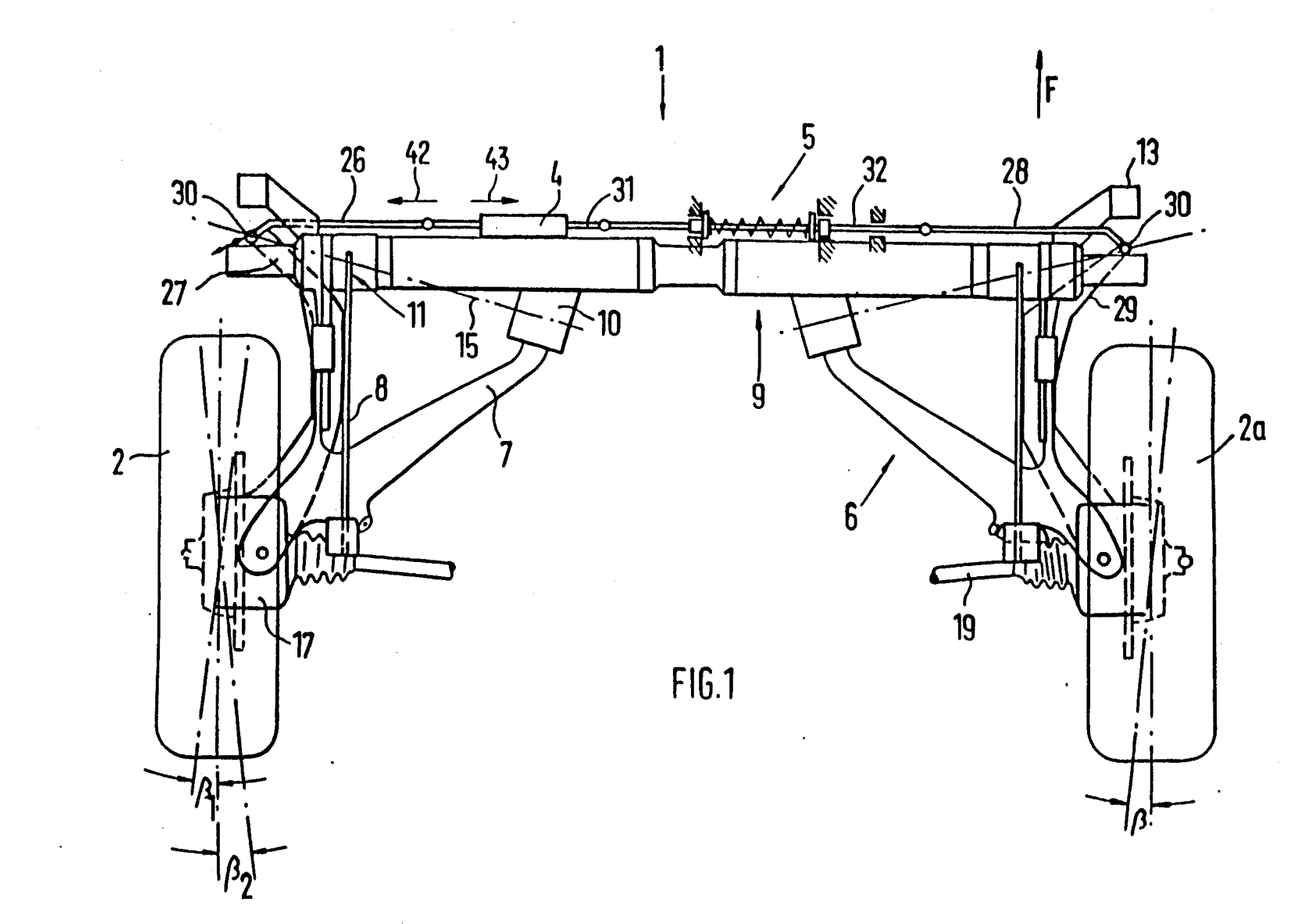
FIG. 1 is a schematic overall view of a rear axle with semi-trailing arms and a rear wheel steering device.
Figure 3:
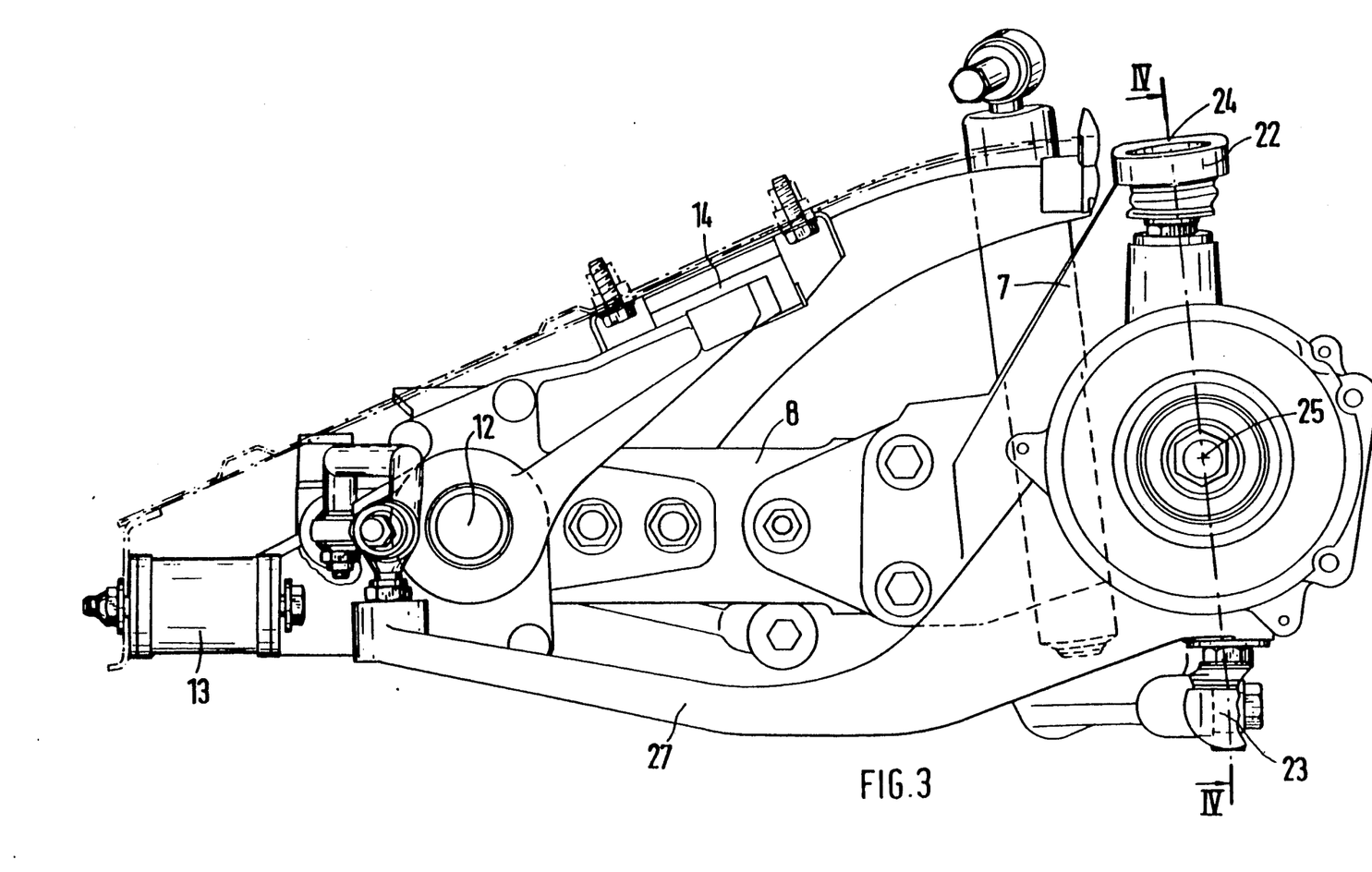
FIG. 3 is an enlarged lateral view of the semi-trailing arm device according to FIG. 2 viewed in the direction of arrow X.

A steering device 1 for the rear wheels 2, 2a of a motor vehicle comprises essentially a control cylinder 4 with a coupled restoring device 5 and a hydraulic pressure circuit therefor (not shown in detail). The wheel suspension takes place by a wheel suspension link 6 which in the embodiment according to FIG. 1, consists of a semi-trailing arm device. This semi-trailing arm device 6 has a first diagonally extending link or bearing arm 7 and a second link are bearing arm 8, which extends in longitudinal direction of the vehicle. The mounting of the link 6 at the body takes Place at a subframe or at a cross tube 9 with the first link arm 7 mounted by a bearing 10 and the second link arm 8 firmly connected at a bearing site 11 of the cross tube 9. The cross tube 9 is supported at the vehicle body by bearings 14 and 13 and is equipped with a torsion spring 12.

Figure 4:
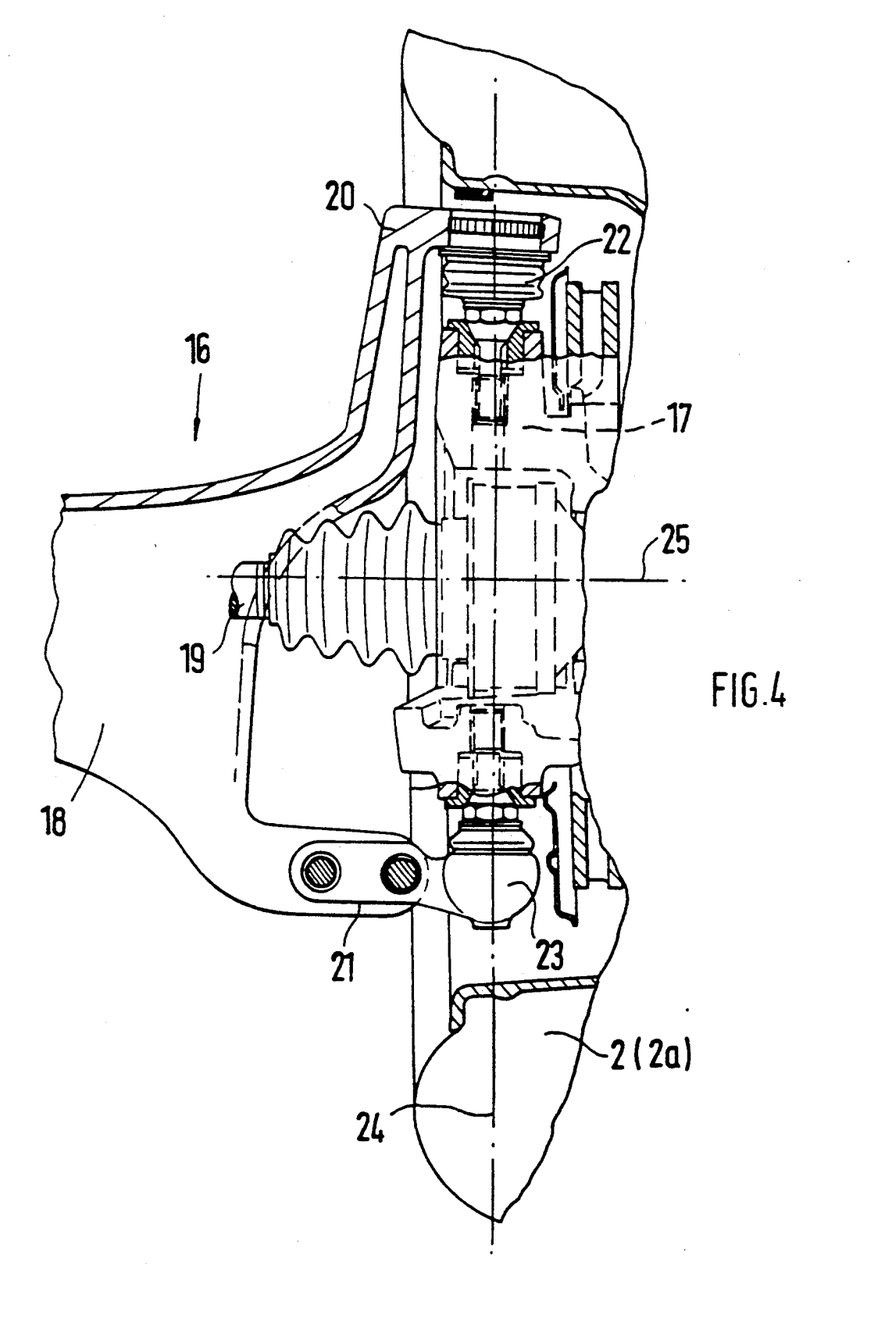
FIG. 4 is an enlarged sectional view according to Line IV—IV of FIG. 3.

The bearing 10 and the bearing site 11 of the link 6 form a swivelling axis 15 of the semi-trailing arm 6 device, which extends approximately in a horizontal plane from the bearing 10 to the bearing site 11 and diagonally to the outside with respect to the driving direction F. In an area 16 (see FIG. 4) in front of a wheel carrier 17, the two link arms 7, 8 are connected by a molded-on guide part 18 and through which extends a wheel drive shaft 19. Bearing arm portions 20, 21 of the guide part 18 of the wheel carrier 17 reach over from above and below the wheel axis 25. These bearing arm portions 20, 21 are hinged to the wheel carrier 17 at support joints 22, 23. A connecting line placed through these joints 22, 23 forms an axis of rotation 24 for the rear wheels 2, 2a during a steering or bearing angle adjustment. Steering levers 27, 29 are constructed to be in one piece with the wheel carrier 17. The control cylinder 4 is connected with a steering lever 27 of the one rear wheel 2, which is located on the left with respect to the driving direction F by a first tie rod 26 for the steering angle adjustment of the rear wheels 2, 2a. Through the insertion of the spring restoring device 5, a second tie rod 28 is connected with a steering lever 29 of the other rear wheel 2a, which is located on the right. Connecting tie rods 26 and 28 are connected to their respective steering levers 27 and a deflecting joint 30. This deflecting joint is arranged in the swivelling axis 15 of the suspension link 6, whereby, during springing movements of the link 6, an unintentional influencing of the toe-in of the rear wheels 2, 2a is avoided.

The restoring device 5 is preferably fastened at the cross tube 9 so that its axis coincides with that of the control cylinder 4, and comprises an adjusting rod 32, which is connected with the piston rod 31 of the cylinder 4. This adjusting rod 32 is guided in an axially movable manner in a cylindrical tube 33 (FIG. 5) by bearing bushes 34, 35 arranged at the end face. In order to achieve a restoring movement of the control cylinder 4 into its center position M which corresponds to a straight-ahead position of the wheels 2, 2a with the steering angle $\beta = 0$, the adjusting rod 32 is acted upon by pressure springs 36, 37. For this purpose, the adjusting rod 32 is equipped with a stop disk 38, which is fixed at the rod. Pressure disks 39, 40 rest against the stop disk 38 on both sides, while tensioning springs 36, 37 apply force against the disks 39, 40. In the shown center position M, the pressure disks 39, 40 with the stop disk 38 located between them, support themselves at a sectional ring 41, which is firmly connected with the cylinder tube 33. When the adjusting rod 32 is moved, for example, in the direction of arrow 42 for the adjustment of a rear wheel steering angle, the pressure disk 39, under the tension of the spring 36, lifts off the sectional ring 41. Correspondingly, when the adjusting rod 32 is moved in the direction of arrow 43, the pressure disk 40 lifts off the sectional disk 41.

Figure 7:
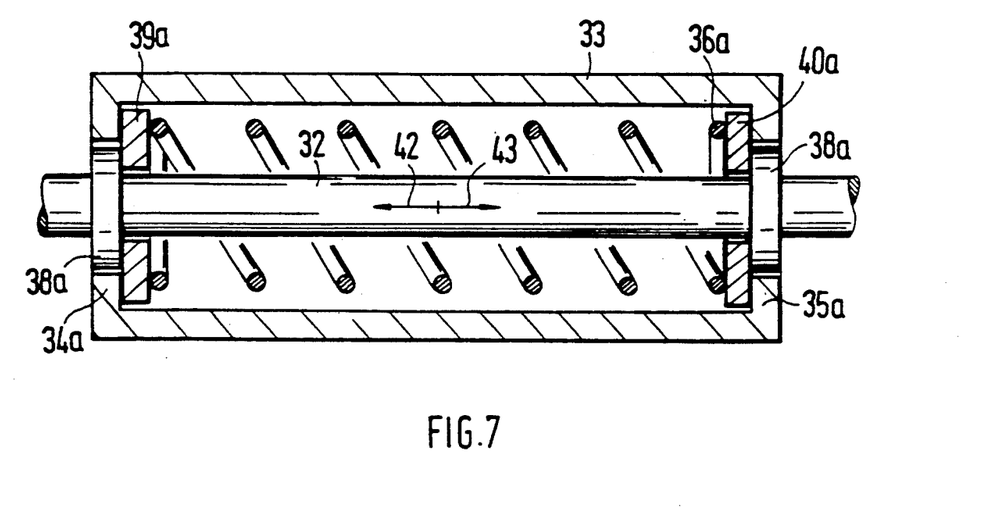
FIG. 7 is another embodiment of a restoring device having a spring.

According to another embodiment of a restoring device according to FIG. 7, this restoring device is equipped with a single pressure spring 36a. In the cylinder tube 33, the adjusting rod 32 is guided by means of slidable disks 39a, 40a, which support themselves at the end stops 34a, 35a of the tube 33 under the tension of the inserted pressure spring 36a. In the plane of the end stops 34a and 35a, stop disks 38a, 38b are provided, which are fixed at the rod and which, in the shown center position, rest against the pressure disks 39a, 40a. When the steering angle is adjusted, the adjusting rod moves in the direction of arrows 42, 43, while taking along the respective pressure disk 39a or 40a against the tension of the spring 36a, which causes a restoring of the control cylinder 4.

Figure 6:
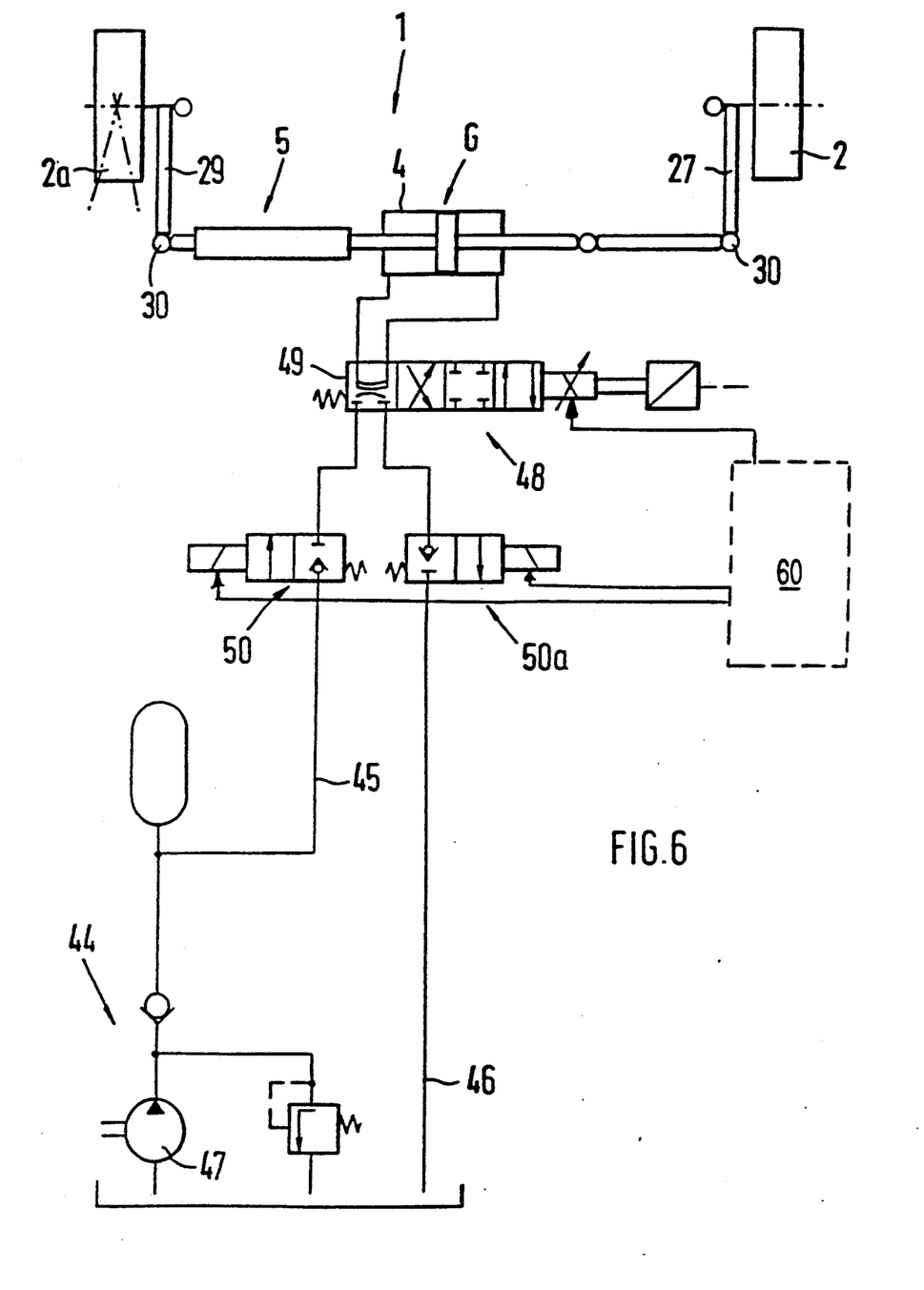
FIG. 6 is a schematic representation of the hydraulic control of the control cylinder with the throttle valve and the shutoff valves.

A pressure medium is fed to the control cylinder 4 by means of a pressure supply unit 44 through feed pipe 45, and the pressure medium is returned through a return pipe 46 and is guided to an oil sump (see FIG. 6). A spring biased controllable multipath control valve 48 having a flow control device 49 is connected in series in the feeding pipe 45 between a pump 47 and the control cylinder 4. This flow control device 49 cooperates with the shutoff valves 50, 50a of the hydraulic circuit which are arranged in the return flow and feed pipes 45, 46.

For the adjustment of the wheel steering angle $\beta_1$ and $\beta_2$ (FIG. 1), the control cylinder 4 is controlled, as a function of operating and driving parameters of the vehicle, and carries out an axial movement in the direction of arrows 42 or 43. When the adjusting rod 32 of the restoring device 5 shifts, one of the pressure disks 39, 40 leaves its supported position at the sectional ring 41. The tie rod 26 or 28 moves the steering lever 27 or 29 and thus the wheel carrier 17 between the two joints 22, 23 of the link 6, around the axis 24 of rotation.

In the case of a failure or defect in the hydraulic and/or electric control circuit of the steering device, the rear wheels 2, 2a are restored slowly and automatically into a straight-ahead position by the restoring device 5. For this purpose, the feeding of a medium to the control cylinder 4 by means of the pump 47 of a pressure supply unit 44 is stopped by the spring biased shutoff valves 50 and 50a closing, and the spring biased multipath valve 48 takes up a throttling position via throttle valve 49 where the ends of the cylinder are connected through a restricted flow path in the leftmost position of the control valve 48. The control cylinder 4, by the spring biased restoring device 5, is shifted into its position M, in which throttling position the excess medium, by the restricted flow control throttling position 49, flows from one chamber of the control cylinder into the other chamber. As a result, it becomes possible to slowly swivel the rear wheels 2, 2a back into a straight-ahead Position, while the pressure springs 36 or 37 take along the piston rod 31, shift the rod into position M (FIG. 5). In this position, the wheels 2, 2a are held without play by means of the restoring device, because the holding force of the springs is designed to be higher than the possible disturbing forces to which the wheels are subjected.

Other positions of the control valve starting from the left of FIG. 6 include turning to the right, holding the piston in cylinder 4 fixed at its then position and turning to the left. The particular control system 60 for movement of this valve can be of any desired construction, normally an electronic control computer which adjusts the steering angle of the rear wheels in response to the steering angles of the front wheels, and has not been specifically disclosed as the invention is directed merely to the valve and actuator steering system for the rear wheels.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A steering system for a motor vehicle having:
    a first steering device for front wheels of the motor vehicle operatively arranged to be actuated by a steering wheel; and
    a second steering device for rear wheels of the motor vehicle held by wheel suspension links, comprising (a) an integral semi-trailing arm device for each of the rear wheels linked to a body side of the motor vehicle by bearings to define a swivel axis of the semi-trailing arm device and configured to have two bearing arms rigidly secured with respect to each other and operatively arranged to hold wheel carriers of the rear wheels so that the rear wheels are pivotable about a vertical axis of rotation, (b) support joints arranged in planes one above the other and above and below a wheel axis of the rear wheels and operatively associated with the bearing arms for permitting pivoting of the rear wheels about the vertical axis, (c) a hydraulic control cylinder, (d) a restoring device operatively connected with the hydraulic control cylinder along a common axis, (e) bearing levers integral with the wheel carriers, (f) tie rods operatively connected between, on one hand, a respective one of the hydraulic control cylinder and the restoring device, and, on the other hand, to the bearing levers via a deflecting joint arranged in a swivel axis of the semi-trailing arm device, wherein the tie rods share the common axis of the hydraulic control cylinder and the restoring device, (g) a cross tube secured at the body of the motor vehicle for supporting the semi-trailing arm device via the bearings defining the swivel axis, and (h) an electronic control unit operatively connected with the hydraulic control cylinder for steering of the rear wheels in response to driving conditions fed to the electronic control unit independently of the front wheels.

2. The steering system according to claim 1, wherein the restoring device is a spring restoring device comprising a cylinder tube having end stops, slidable pressure disks supported at the end stops, an adjusting rod guided axially slidably in the cylinder tube, and exterior stop disks secured on the adjusting rod so as to hold the adjusting rod in an adjusted position.

3. The steering system according to claim 2, further comprising a pressure supply unit and a hydraulic pressure circuit having two shut off valves, a feeding pipe and a return pipe, and operatively connected between the pressure supply unit and the hydraulic control cylinder, wherein the spring restoring device is coupled in a throttleable manner to the hydraulic pressure circuit and the two shutoff valves are upstream of the hydraulic control cylinder, one of which shutoff valves is operatively arranged in the feeding pipe of the hydraulic pressure circuit and the other in which shutoff valves is operatively arranged in the return pipe of the hydraulic pressure circuit.

4. The steering system according to claim 3, wherein the shutoff valves are configured to provide an automatic and relatively slow restoration of the rear wheels to a center position.

5. The steering system according to claim 4, wherein a throttle valve is operatively connected between the two shutoff valves and the hydraulic control cylinder and actuatable in response to the electronic control unit, and is configured such that when the electronic control unit does not actuate the throttle valve, a spring force causes the throttle valve automatically to take up a throttling position and the two shutoff valves are moved into a shutoff position to permit the automatic and relatively slow restoration of the rear wheels to the center position.

6. A steering method for a motor vehicle comprising the steps of:
    steering front wheels of the motor vehicle in response to actuation of a steering wheel;
    steering rear wheels of the motor vehicle independently of the steering of the front wheels in response to determined driving conditions, wherein the steering of the rear wheels includes the steps of (a) supplying the determined driving conditions to an electronic control unit which is operatively connected with a hydraulic pressure circuit which, in turn, is operatively connected with a hydraulic control circuit, (b) varying a steering angle of the rear wheels via a semi-trailing arm device swivelable around an axis operatively associated with the hydraulic control cylinder via a restoring device and integrally configured with connected control arms to hold wheel carriers of the rear wheels so as to be pivotable with a large base about a vertical axis of rotation for varying the steering angle, and, in response to a failure of at least one of the electronic control unit and hydraulic pressure circuit, automatically and relatively slowly restoring the rear wheels to a straight ahead position.

* * * * *